United States Patent
Su et al.

(10) Patent No.: US 11,156,905 B2
(45) Date of Patent: Oct. 26, 2021

(54) CONTROL METHOD FOR GIMBAL, CONTROLLER, AND GIMBAL

(71) Applicant: SZ DJI OSMO TECHNOLOGY CO., LTD., Shenzhen (CN)

(72) Inventors: Tie Su, Shenzhen (CN); Paul Pan, Shenzhen (CN)

(73) Assignee: SZ DJI OSMO TECHNOLOGY CO., LTD., Shenzhen (CN)

(*) Notice: Subject to any disclaimer, the term of this patent is extended or adjusted under 35 U.S.C. 154(b) by 0 days.

(21) Appl. No.: 16/727,630

(22) Filed: Dec. 26, 2019

(65) Prior Publication Data

US 2020/0133101 A1  Apr. 30, 2020

Related U.S. Application Data

(63) Continuation of application No. PCT/CN2017/101398, filed on Sep. 12, 2017.

(51) Int. Cl.
  *G03B 17/56* (2021.01)
  *H04N 5/232* (2006.01)
  *B64C 39/02* (2006.01)
  *B64D 47/08* (2006.01)

(52) U.S. Cl.
  CPC .......... *G03B 17/561* (2013.01); *B64C 39/024* (2013.01); *B64D 47/08* (2013.01); *H04N 5/23299* (2018.08); *B64C 2201/127* (2013.01)

(58) Field of Classification Search
  USPC ....................................................... 396/421
  See application file for complete search history.

(56) References Cited

U.S. PATENT DOCUMENTS

| 9,360,740 | B2* | 6/2016 | Wagner | ................. G03B 17/561 |
| 2009/0257741 | A1* | 10/2009 | Greb | ...................... F16M 11/18 |
| | | | | 396/55 |
| 2014/0270743 | A1* | 9/2014 | Webb | ................. H04N 5/23248 |
| | | | | 396/55 |
| 2016/0150134 | A1 | 5/2016 | Katoh et al. | |
| 2016/0318365 | A1 | 11/2016 | Sivaraman | |

FOREIGN PATENT DOCUMENTS

| CN | 102707734 | A | 10/2012 |
| CN | 202499280 | U | 10/2012 |
| CN | 102913766 | A | 2/2013 |
| CN | 104149985 | A | 11/2014 |
| CN | 104390112 | A | 3/2015 |
| CN | 104991571 | A | 10/2015 |
| CN | 105223967 | A | 1/2016 |
| CN | 105824235 | A | 8/2016 |

(Continued)

OTHER PUBLICATIONS

The World Intellectual Property Organization (WIPO) International Search Report for PCT/CN2017/101398 dated May 30, 2018 8 pages.

*Primary Examiner* — Clayton E. LaBalle
*Assistant Examiner* — Warren K Fenwick
(74) *Attorney, Agent, or Firm* — Anova Law Group, PLLC

(57) ABSTRACT

A control method for a gimbal is provided. The control method includes determining an acceleration of a base of the gimbal and controlling a movement response speed of the gimbal according to the acceleration of the base to allow an attitude adjustment of a camera of the gimbal.

20 Claims, 4 Drawing Sheets

(56) References Cited

FOREIGN PATENT DOCUMENTS

| | | | |
|---|---|---|---|
| CN | 105955328 | A | 9/2016 |
| CN | 106227240 | A | 12/2016 |
| CN | 106292726 | A | 1/2017 |
| CN | 106292741 | A | 1/2017 |
| CN | 206130457 | U | 4/2017 |
| CN | 106681369 | A | 5/2017 |
| CN | 106959110 | A | 7/2017 |
| CN | 107079103 | A | 8/2017 |
| CN | 107111322 | A | 8/2017 |
| CN | 206413090 | U | 8/2017 |
| JP | H01225900 | A | 9/1989 |
| JP | H1169339 | A | 3/1999 |
| JP | 2000356797 | A | 12/2000 |

\* cited by examiner

CONTROL METHOD FOR GIMBAL, CONTROLLER, AND GIMBAL

CROSS-REFERENCE TO RELATED APPLICATION

This application is a continuation of International Application No. PCT/CN2017/101398, filed on Sep. 12, 2017, the entire content of which is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates to the field of control technology and, more particularly, to a control method for a gimbal, a controller, and the gimbal.

BACKGROUND

When a camera is mounted on a gimbal for photographing, it is necessary to capture a target moving at a slow speed at one time, and to suddenly accelerate to capture a target moving at a fast speed at the other time.

The speed of the gimbal to smoothly follow the target is determined by its speed configuration. The faster the configured speed is, the faster the speed for following the target is. If the speed for following the target is configured to be fast, the gimbal may respond quickly to closely follow the target with captured moving moments. However, such captured pictures are often very stiff. If the speed for following the target is configured to be slow, the captured pictures may be softer and smoother. In this case, the camera may not handle a sudden acceleration, which may result in loss of the target for capturing.

Therefore, it is desirable that the gimbal can provide a slow speed for following the target when a slow following is needed to allow a smooth picture to be captured. It is also desirable that the gimbal can provide a high speed for following the target when the target is fast moving to allow the gimbal to closely follow the target.

SUMMARY

One aspect of present disclosure provides a control method for a gimbal. The control method includes determining an acceleration of a base of the gimbal and controlling a movement response speed of the gimbal according to the acceleration of the base to allow an attitude adjustment of a camera of the gimbal.

Another aspect of present disclosure provides a controller. The controller includes a memory, storing program code; and a process, coupled with the memory. When the program code being executed, the processor is configured to determine an acceleration of a base of a gimbal; and control a movement response speed of the gimbal, according to the acceleration of the base, to allow an attitude adjustment of a camera of the gimbal.

Another aspect of present disclosure provides a gimbal. The gimbal includes a base, a controller, and a rotation structure. The controller is configured to determine an acceleration of the base. The controller is further configured to, according to the acceleration of the base, control a movement response speed of the gimbal, by controlling a movement of the rotation structure, to allow an attitude adjustment of a camera on the gimbal.

BRIEF DESCRIPTION OF THE DRAWINGS

In order to more clearly illustrate technical solutions in embodiments of the present disclosure, drawings required for describing the embodiments are briefly illustrated hereinafter. Obviously, the following drawings are merely examples for illustrative purposes according to various disclosed embodiments of the present disclosure and are not intended to limit the scope of the present disclosure. Those skilled in the art may obtain other drawings according to the drawings of the present disclosure without any creative efforts.

DETAILED DESCRIPTION

The technical solutions in the embodiments of the present disclosure are described in the following with reference to the accompanying drawings in the embodiments of the present disclosure. It is obvious that the described embodiments are merely a portion of the embodiments of the present disclosure, but not all embodiments. All other embodiments, based on the embodiments of the present disclosure, obtained by those skilled in the art without creative efforts are within the scope of the present disclosure.

It should be noted that, in the embodiments of the present disclosure, when a component is "fixedly connected" or "connected" to another component, or a component is "fixed" to another component, the component may be directly on another component or may be a centered component.

Unless otherwise defined, all technical and scientific terms used in the present disclosure may have the same meaning commonly understood by those skilled in the art. The terminology used in the present disclosure may be merely for the purpose of describing specific embodiments and may not be intended to limit the scope of the present disclosure. The term "and/or" as used in the present disclosure includes any and all combinations of one or more of the associated listed items.

A gimbal may be a supporting device for mounting and fixing a camera. The gimbal in the embodiments of the present disclosure may be a handheld gimbal, and may also be disposed on a movable object, such as an unmanned aerial vehicle, a car and the like.

In the embodiments of the present disclosure, the gimbal may include at least one rotation structure, and the rotation structure may include a motor (e.g., a brushless motor or a brushed motor) and an arm.

Figure 1:
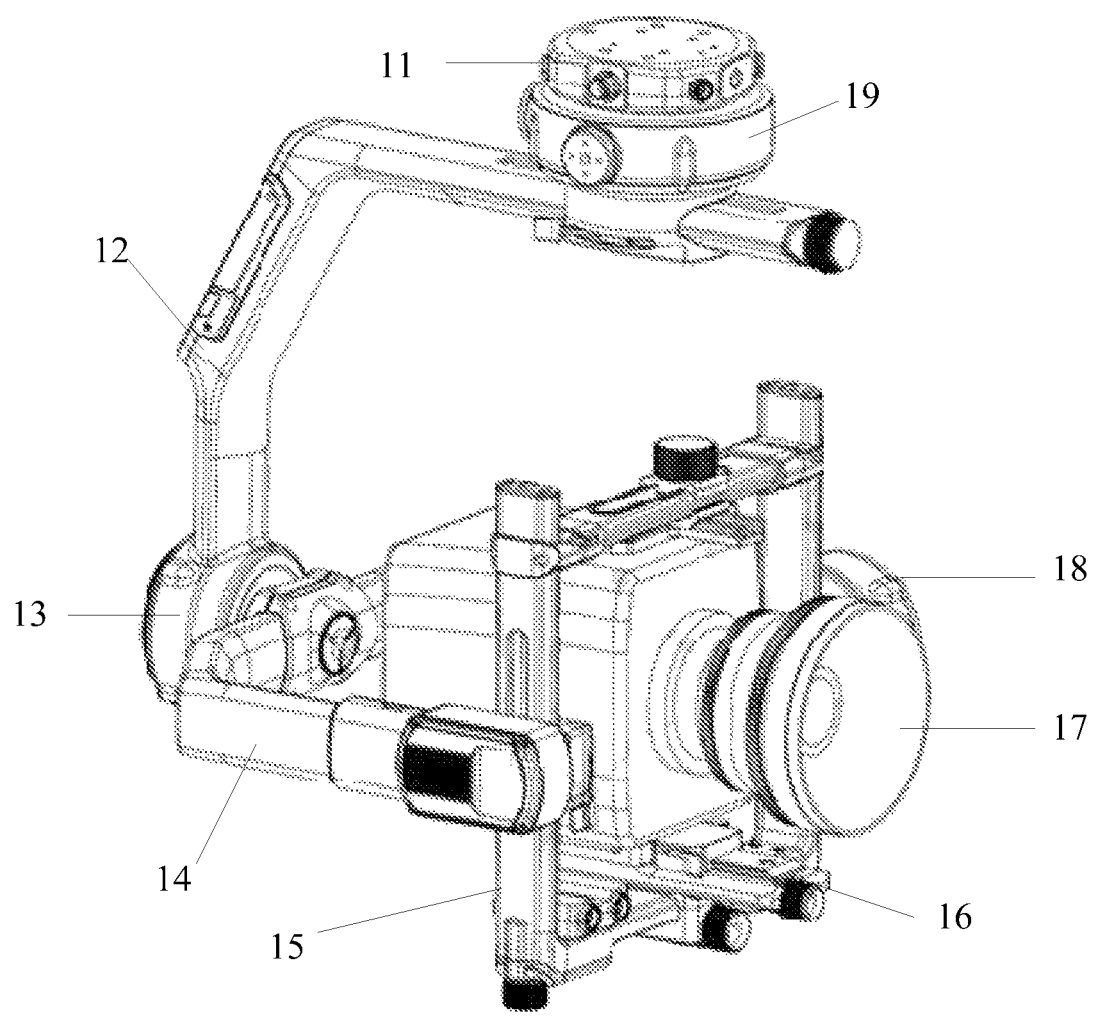
FIG. 1 illustrates a structural schematic of a gimbal according to various disclosed embodiments of the present disclosure.

For example, in the gimbal shown in FIG. 1, the rotation structure may include a pitch axis mechanism, a roll axis mechanism, and a yaw axis mechanism. A plurality of rotation structures may be connected in series.

As shown in FIG. 1, the pitch axis mechanism may include a pitch axis motor 18 and a pitch axis arm 15, the roll axis mechanism may include a roll axis motor 13 and a roll axis arm 14, and the yaw axis mechanism may include a yaw axis motor 19 and a yaw axis arm 12.

Optionally, the gimbal shown in FIG. 1 may further include a base 11. When the gimbal is a handheld gimbal, the base may move with the movement of a user's hand. When the gimbal is connected to the movable object, the base may be rigidly connected to the movable object and move with the movement of the movable object.

Optionally, the gimbal shown in FIG. 1 may further include an inertial measurement unit (IMU) 16. The IMU 16 may not move relative to the camera and may be used to measure an attitude of the camera. For example, the IMU 16 may be rigidly fixed to a camera fixing structure.

Optionally, an IMU (not shown) may also be disposed on the base of the gimbal shown in FIG. 1. The IMU may not move relative to the base. For example, the IMU may be rigidly fixed to the base.

When the camera 17 is mounted on the gimbal for capturing, it is necessary to capture a target moving at a slow speed at one time, and to suddenly accelerate to capture a target moving at a fast speed at the other time.

When the gimbal is the handheld gimbal for capturing a moving target, the user may rotate the gimbal, that is, rotate the base of the gimbal; and a controller may be used to control the rotation structure, thereby matching a target attitude of the camera with an attitude of the base.

When the gimbal is the handheld gimbal, a handheld stick or a handheld ring may be connected to the base, the user may control the movement of the gimbal through the handheld stick or the handheld ring.

Similarly, when the gimbal is disposed on the movable object for capturing the target, the moving object may move to drive the movement of the gimbal, that is, the movement of the base of the gimbal; and the controller may be used to control the rotation structure, thereby matching the target attitude with the attitude of the base.

The following describes how to implement solutions of the control of the gimbal movement based on the base movement.

It should be understood that the following embodiments may also be applied to scenarios other than the above-mentioned scenarios (i.e., the user or the moving target may move to drive the movement of the base, and the controller may control the movement of the gimbal, thereby matching the gimbal attitude with the base attitude), and as long as the control of the gimbal movement is based on the base movement, such scenarios may be within the protection scope of the present disclosure.

Figure 2:
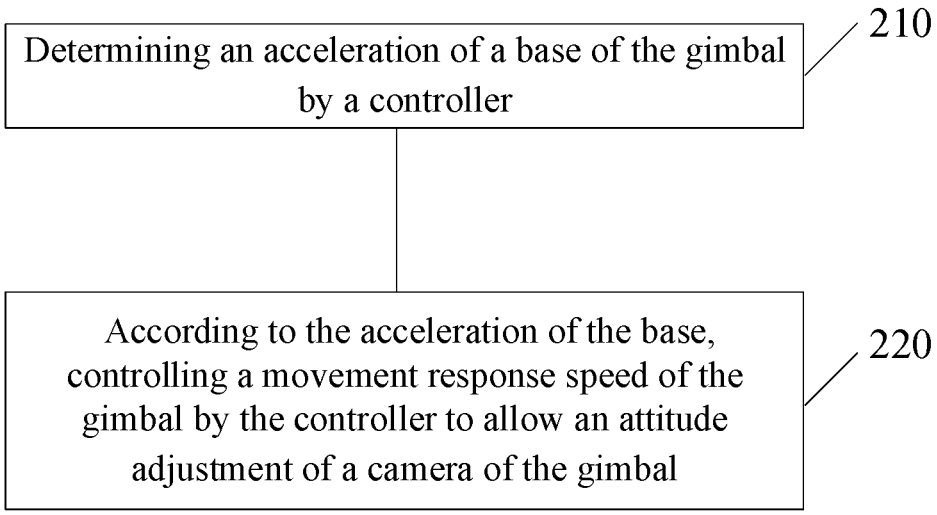
FIG. 2 illustrates a schematic flow chart of a control method for a gimbal according to various disclosed embodiments of the present disclosure.

FIG. 2 illustrates a schematic flow chart of a control method 200 for the gimbal according to various disclosed embodiments of the present disclosure. The control method 200 of the gimbal may include at least a portion of the following contents.

At 210, the controller may determine an acceleration of the gimbal base.

Optionally, the controller may determine an angular velocity of the base using a second IMU, where the second IMU may not move relative to the base, and a change of the angular velocity may be used to determine the acceleration of the gimbal base.

Optionally, the controller may directly obtain the angular velocity of the base using the second IMU, where the second IMU may be rigidly fixed on the base.

Optionally, when the gimbal is the handheld gimbal, in addition to disposing of the IMU on the base, the IMU may also be disposed on the handheld stick or ring of the gimbal.

It should be understood that the acceleration, the angular velocity or the attitude mentioned in the embodiments of the present disclosure may be measured by other devices than the IMU, such as a gyroscope and the like.

At 220, according to the acceleration of the base, the controller may control a movement response speed of the gimbal, thereby facilitating the attitude adjustment of the camera on the gimbal.

For example, after obtaining the acceleration of the base, the controller may control the movement of the gimbal motor based on the acceleration of the base, thereby implementing the control of the movement response speed of the gimbal.

Therefore, in the embodiments of the present disclosure, the controller may control the movement response speed of the gimbal, based on the acceleration of the gimbal base, to adjust the attitude of the camera on the gimbal, thereby combining the acceleration of the base to intelligently control the movement response speed of the gimbal, which may avoid the captured images to be stiff when a configured velocity is too high, and also avoid the problem of not closely following the target when the configured velocity is too low.

For example, if a photographer thinks that the gimbal follows too fast, the photographer may decrease a gimbal following velocity by rotating the base to improve the smoothness of the gimbal following capturing. Or if the photographer cannot handle a sudden acceleration scenario after deceasing the following velocity, the photographer may increase the following velocity by rotating the base; therefore, the gimbal may automatically recognize the photographer's intention and automatically enter the fast following status, thereby avoiding the problem that the gimbal frequently fails to follow the scenarios.

Optionally, the controller may control the movement response speed of the gimbal according to the acceleration of the base and the angular velocity of the camera.

For example, the controller may determine the acceleration of the base according to the IMU having no movement relative to the base, and determine the angular velocity of the camera according to the IMU having no movement relative to the camera, thus the movement response speed of the gimbal may be controlled according to the angular velocity of the base and the angular velocity of the camera.

Therefore, in the embodiments of the present disclosure, the movement response speed of the gimbal may be controlled according to not only the acceleration of the base, but also the angular velocity of the camera, thereby more rationally controlling the movement response speed of the gimbal.

Optionally, the controller may control the movement response speed of the gimbal according to the acceleration of the base, and a relationship between the angular velocity of the camera and the angular velocity of the base.

For example, when the acceleration of the base is greater than or equal to a first value, and a difference between the angular velocity of the base and the angular velocity of the camera is greater than or equal to a second value, the movement response speed of the gimbal may be adjusted.

For example, an angular velocity omega_base of the base is outputted by the IMU having no movement relative to the base, and an angular velocity omega_camera of the camera is outputted by the IMU having no movement relative to the gimbal. If the angular velocity omega_base of the base increases suddenly (i.e., the acceleration exceeds a certain value) and is greatly larger than the angular velocity omega_camera of the camera (i.e., the difference between the angular velocity of the base and the angular velocity of the camera exceeds a certain value), it may indicate that the movable object or the user quickly rotates the gimbal base, and the angular velocity of the camera is greatly less than the angular velocity of the base. In order to prevent the camera from losing the target following, the movement response speed of the gimbal may be increased, thereby implementing the quick switching from a slow following to a fast flowing.

Optionally, the controller may control the movement response speed of the gimbal according to the angular velocity of the base and a change rate of the angular velocity of the camera.

For example, when the acceleration of the base is less than or equal to a third value, and the change rate of the angular velocity of the camera is less than or equal to a fourth value, the movement response speed of the gimbal may not be adjusted.

For example, the angular velocity omega_base of the base is outputted by the IMU having no movement relative to the base, and the angular velocity omega_camera of the camera is outputted by the IMU having no movement relative to the gimbal. If the angular velocity omega_base of the base decreases suddenly, and the angular velocity omega_camera of the camera does not change, the movement response speed of the gimbal may not be adjusted to prevent the camera from suddenly changing the following velocity.

It should be understood that the above-mentioned described manners for controlling the movement response speed of the gimbal according to the acceleration of the base and the angular velocity of the camera may be merely some optional implementation manners and may not limit the scope of the present disclosure.

For example, when the acceleration of the base is negative and the acceleration is greater or equal to a certain value, the movement response speed of the gimbal may not be adjusted.

For example, when the acceleration of the base is negative and the acceleration is greater or equal to a certain value, and the rate change of the angular velocity of the camera is less than or equal to a certain value, the movement response speed of the gimbal may not be adjusted.

It should also be understood that although the above-mentioned description is based on the change rate of the angular velocity of the camera or the relationship between the angular velocity of the camera and the angular velocity of the base, the movement response speed of the gimbal may also be directly adjusted in combination with the angular velocity of the camera in the embodiments of the present disclosure.

For example, when the acceleration of the base is less than or equal to a certain value, and the angular velocity of the camera is less than or equal to a certain value and is greater than or equal to another certain value, the movement response speed of the gimbal may not be adjusted.

It also should be understood that the combination of the acceleration of the base and the angular velocity of the camera is used to determine whether the movement response speed of the gimbal is adjusted, but in the embodiments of the present disclosure, the combination of the acceleration of the base and the angular velocity of the camera may also be used to determine a specific quantity for adjusting the movement response speed of the gimbal.

Optionally, in the embodiments of the present disclosure, the controller may determine an attitude quantity for adjusting the camera and may control the movement response speed of the gimbal according to the attitude quantity for adjusting the camera and the acceleration of the base.

For example, when the controller controls the movement response speed of the gimbal, it may be not only based on the acceleration of the base, and also based on the attitude quantity for adjusting the camera.

Optionally, the attitude quantity for adjusting the camera may indicate a total adjustment quantity for the camera attitude. After adjusting the adjustment quantity, the camera may follow the target object to be captured.

The attitude quantity for adjusting the camera may be inputted by the user. For example, the attitude quantity for adjusting the camera may be inputted into an input system connected to the controller.

Or, the attitude quantity for adjusting the camera may be obtained based on the attitude of the base, and an actual attitude of the camera, thereby implementing that the camera attitude follows the base attitude.

For example, the attitude quantity for adjusting the camera may be obtained by subtracting the actual attitude of the camera from an actual attitude of the base.

For example, the attitude quantity for adjusting the camera may be obtained by subtracting both the actual attitude of the camera and a dead zone from the actual attitude of the base.

For example, a dead zone problem may exist during the gimbal following process. A size of the dead zone may determine how far the gimbal does not follow from a center point of the camera. Therefore, an actual attitude quantity for adjusting the camera may be obtained by subtracting an attitude of the dead zone and also the dead zone from the actual attitude of the base.

Optionally, the actual attitude of the camera may be obtained by the IMU having no movement relative to the camera.

For example, the controller may perform integral correction based on the gyroscope and accelerometer on the IMU to obtain an IMU attitude. Since the camera is rigidly fixed on the camera fixing structure of the gimbal, the IMU attitude may be equal to the camera attitude.

Optionally, the actual attitude of the base may be obtained from the actual attitude of the camera and data of motor axles of the gimbal.

Optionally, the data of the motor axles of the gimbal may reflect a difference between the attitude of the camera and the attitude of the base. Therefore, the actual attitude of the base may be obtained based on the actual attitude of the camera and the data of the motor axles (i.e., data of the pitch axis, the yaw axis, and the roll axis) of the gimbal.

Obviously, the actual attitude of the base may be obtained from the IMU having no movement relative to the base. At such case, the actual attitude of the camera may be obtained from the IMU having no movement relative to the camera.

Or, the actual attitude of the base may be obtained from the IMU having no movement relative to the base, and the actual attitude of the camera may be obtained from the actual attitude of the base and the data of the motor axles.

Optionally, in the embodiments of the present disclosure, the controller may determine an adjustment degree for adjusting a preset velocity coefficient of the gimbal using a preset acceleration coefficient of the gimbal according to the acceleration of the base; the controller may adjust the preset velocity coefficient according to the preset acceleration coefficient and the adjustment degree; and the controller may adjust the movement response speed of the gimbal using an adjusted velocity coefficient and the attitude quantity for adjusting the camera.

Optionally, in the embodiments of the present disclosure, the velocity coefficient may determine the quick responsiveness of the gimbal for driving the camera to follow the target and may characterize velocity. However, the velocity coefficient may not be the velocity conventionally known.

For example, a value obtained by multiplying a square of the velocity coefficient with a square of the attitude quantity for adjusting the camera may be an attitude quantity for adjusting the camera in a next control time slice.

It should be understood that, in the embodiments of the present disclosure, the movement control of the gimbal by the controller may be controlled in units of time slices. Computing the movement quantity of the gimbal at each time slice may be equivalent to determining the movement response speed of the gimbal.

Optionally, in each time slice, the attitude quantity for adjusting the camera may be computed in real time (may be implemented by obtaining the actual attitude of the base and the actual attitude of the camera in real time), and/or the angular velocity of the base and the angular velocity of the camera may be computed in real time, where the real time may refer to that the computation may be executed one time for each time slice, and such values may be different for different time slices.

Optionally, in the embodiments of the present disclosure, the acceleration coefficient may indicate a maximum velocity coefficient that the gimbal may reach when accelerating the camera to follow the target. The acceleration coefficient may characterize acceleration but may not be the acceleration conventionally known.

For example, the acceleration coefficient and the attitude quantity for adjusting the camera may be added to a preset or previous velocity coefficient to obtain the adjusted velocity coefficient.

Optionally, in the embodiments of the present disclosure, the user may preset the velocity coefficient and/or the acceleration coefficient. During the moving process, the controller may adjust the acceleration coefficient and/or the velocity coefficient preset by the user in real time.

For example, the controller may determine the adjustment degree of the acceleration coefficient to the velocity coefficient using the acceleration of the base and may adjust the velocity coefficient based on a product of the acceleration coefficient and the adjustment degree.

For example, the product of the acceleration coefficient and the adjustment degree may be multiplied by the attitude quantity for adjusting the camera, and the obtained product value may be added to the preset velocity coefficient to obtain the adjusted velocity coefficient.

Optionally, in addition to the acceleration based on the gimbal base, the adjustment degree of the acceleration coefficient to the velocity coefficient may be further obtained based on the angular velocity of the camera.

In one embodiment, the controller may determine the adjustment degree according to the acceleration of the base, and the relationship between the angular velocity of the camera and the angular velocity of the base.

For example, when the acceleration of the base is greater than or equal to the first value, and the difference between the angular velocity of the base and the angular velocity of the camera is greater than or equal to the second value, the value of the adjustment degree may be determined to be 1.

For example, the angular velocity omega_base of the base is outputted by the IMU having no movement relative to the base, and an angular velocity omega_camera of the camera is outputted by the IMU having no movement relative to the gimbal. If the angular velocity omega_base of the base increases suddenly (i.e., the acceleration exceeds a certain value) and is greatly larger than the angular velocity omega_camera of the camera (i.e., the difference between the angular velocity of the base and the angular velocity of the camera exceeds a certain value), it may indicate that the movable object or the user quickly rotates the gimbal base, and the angular velocity of the camera is greatly less than the angular velocity of the base. In order to prevent the camera from losing the target following, the adjustment degree speed_dynamic_coef may be configured to be 1, thereby increasing the movement response speed of the gimbal.

Optionally, the adjustment degree may be determined according to the angular velocity of the base and the change rate of the angular velocity of the camera.

For example, when the acceleration of the base is less than or equal to the third value, and the change rate of the angular velocity of the camera is less than or equal to the fourth value, the adjustment may be determined to be 0, that is, the velocity coefficient may not be adjusted.

For example, the angular velocity omega_base of the base is outputted by the IMU having no movement relative to the base, and the angular velocity omega_camera of the camera is outputted by the IMU having no movement relative to the gimbal. If the angular velocity omega_base of the base decreases suddenly, and the angular velocity omega_camera of the camera does not change, the adjustment degree speed_dynamic_coef may be configured to be 0, that is, the movement response speed of the gibmal may not be adjusted to prevent the camera from suddenly changing the following velocity.

It should be understood that, in the embodiments of the present disclosure, the values of the adjustment degree may be other values in addition to 0 and 1. For example, it may a value between 0 and 1, a value greater than 1, and a value less than 0, which may be determined in different scenarios.

In order to understand the present disclosure more clearly, the embodiments of the present disclosure may be described with reference to the gimbal control method shown in FIG. 3 hereinafter.

Figure 3:
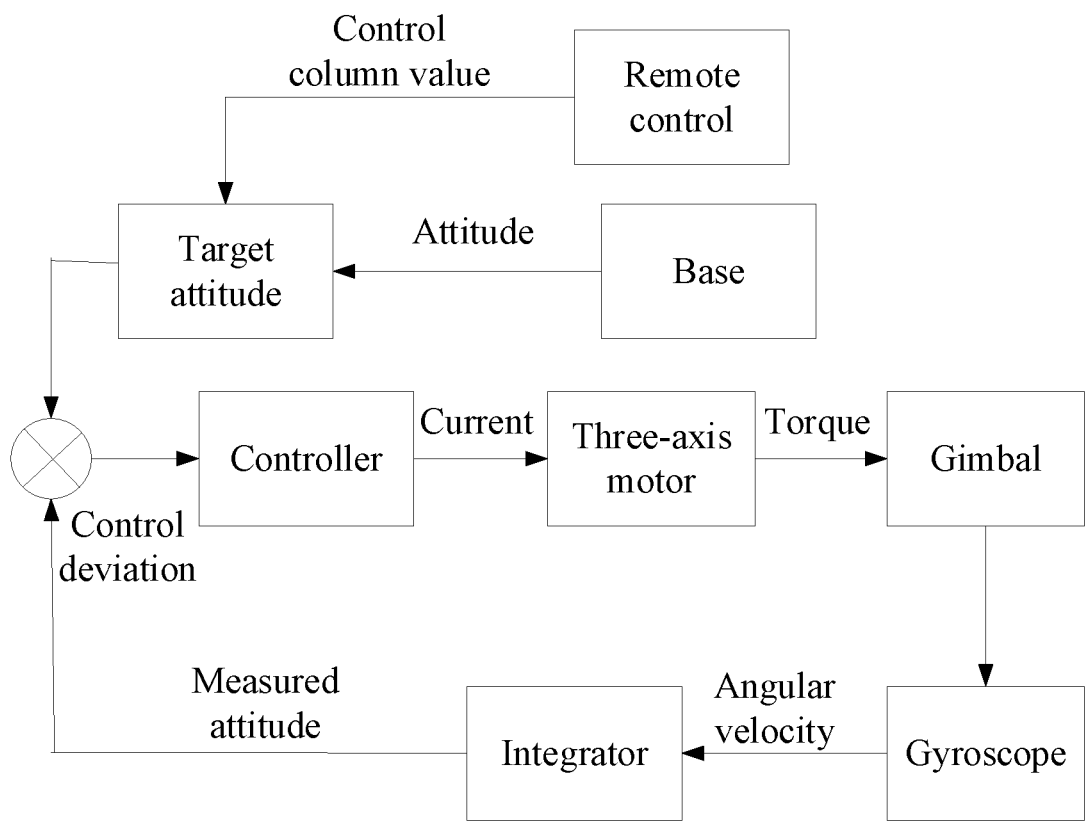
FIG. 3 illustrates a schematic flow chart of a control method for a gimbal according to various disclosed embodiments of the present disclosure.

As shown in FIG. 3, the target attitude of the camera may be obtained according to the attitude of the base and/or a control column value of a remote control; an integrator may integrate the angular velocity outputted by the gyroscope in the IMU to obtain a measurement attitude of the gimbal; the control response speed of the gimbal may be obtained by combining the target attitude of the camera, the measurement attitude of the gimbal, the acceleration of the base and the like; taking into account of control deviation, a control current may be outputted to a three-axis motor; currently, the three-axis motor may generate torque based on the control current, thereby moving the gimbal.

A main control board may provide the target attitude of the camera, and the controller (e.g., a closed-loop controller) may perform feedback control according to the target attitude of the camera and the actual attitude of the camera, which may reduce the deviation between the actual attitude and the target attitude to make the actual attitude of the camera equal to the target attitude of the camera. The smooth movement of the gimbal may be controlled, and the smoothness of the gimbal may be a mode that allows the target attitude of the camera to smoothly follow the attitude of the base.

Figure 4:
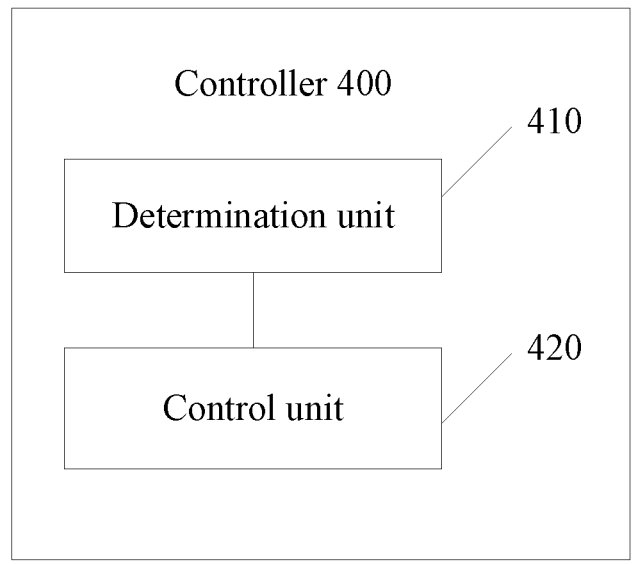
FIG. 4 illustrates a schematic block diagram of a controller according to various disclosed embodiments of the present disclosure.

FIG. 4 illustrates a schematic block diagram of a controller 400 according to various disclosed embodiments of the present disclosure.

As shown in FIG. 4, the controller may include a determination unit 410 and a control unit 420.

The determination unit 410 may be configured to determine the acceleration of the gimbal base; and the control unit 420 may be configured to control the movement response speed of the gimbal according to the acceleration of the base, thereby facilitating the attitude adjustment of the camera of the gimbal.

Optionally, the control unit 420 may further be configured to control the movement response speed of the gimbal according to the acceleration of the base and the angular velocity of the camera.

Optionally, the control unit 420 may further be configured to control the movement response speed of the gimbal according to the velocity of the base and the relationship between the angular velocity of the camera and the angular velocity of the base.

Optionally, the control unit 420 may further be configured to adjust the movement response speed of the gimbal when the acceleration of the base is greater than or equal to the first value, and the difference between the angular velocity of the base and the angular velocity of the camera is greater than or equal to the second value.

Optionally, the control unit 420 may further be configured to control the movement response speed of the gimbal according to the angular velocity of the base and the change rate of the angular velocity of the camera.

Optionally, the control unit 420 may further be configured to not adjust the movement response speed of the gimbal when the acceleration of the base is less than or equal to the third value, and the change rate of the angular velocity of the camera is less than or equal to the fourth value.

Optionally, the determination unit 410 may further be configured to determine the angular velocity of the camera according to the first inertial measurement unit (IMU), where the first IMU may not move relative to the camera.

Optionally, the determination unit 410 may further be configured to determine the acceleration of the base using the second IMU.

Optionally, the determination unit 410 may further be configured to determine the attitude quantity for adjusting the camera. The determination unit 410 may further be configured to control the movement response speed of the gimbal according to the attitude quantity for adjusting the camera and the acceleration of the base.

Optionally, the control unit 420 may further be configured to determine the adjustment degree for adjusting the preset velocity coefficient of the gimbal using the preset acceleration coefficient of the gimbal according to the acceleration of the base or according to the acceleration of the base and the angular velocity of the camera, and may further be configured to adjust the preset velocity coefficient according to the preset acceleration coefficient and the adjustment degree; and may further be configured to adjust the movement response speed of the gimbal using the adjusted velocity coefficient and the attitude quantity for adjusting the camera.

Optionally, the control unit 420 may further be configured to multiply the product of the acceleration coefficient and the adjustment degree with the attitude quantity for adjusting the camera to obtain the fifth value, and the fifth value may be added to the preset velocity coefficient to obtain the adjusted velocity coefficient.

Optionally, the control unit 420 may further be configured to adjust the movement response speed of the gimbal according to the value obtained by multiplying the square of the adjusted velocity coefficient by the square of the attitude quantity for adjusting the camera.

Optionally, the determination unit 410 may further be configured to determine the actual attitude of the camera and the actual attitude of the base and may further be configured to determine the attitude quantity for adjusting the camera according the actual attitude of the camera and the actual attitude of the base.

Optionally, the determination unit 410 may further be configured to determine the attitude quantity for adjusting the camera by subtracting both the actual attitude of the camera and the dead zone from the actual attitude of the base.

Optionally, the determination unit 410 may further be configured to determine the attitude of the first IMU as the actual attitude of the camera, where the first IMU may not move relative to the camera.

Optionally, the determination unit 410 may further be configured to obtain the actual attitude of the base according to the actual attitude of the first IMU and the data of motor axles of the gimbal, where the first IMU may not move relative to the camera.

Optionally, the determination unit 410 may further be configured to obtain the acceleration coefficient preset and the velocity coefficient both preset by the user.

Optionally, the gimbal may be a handhold gimbal.

It should be understood that the controller 400 may implement corresponding operations implemented by the controller in the above-mentioned embodiments, which may not be described in detail for brevity herein.

Figure 5:
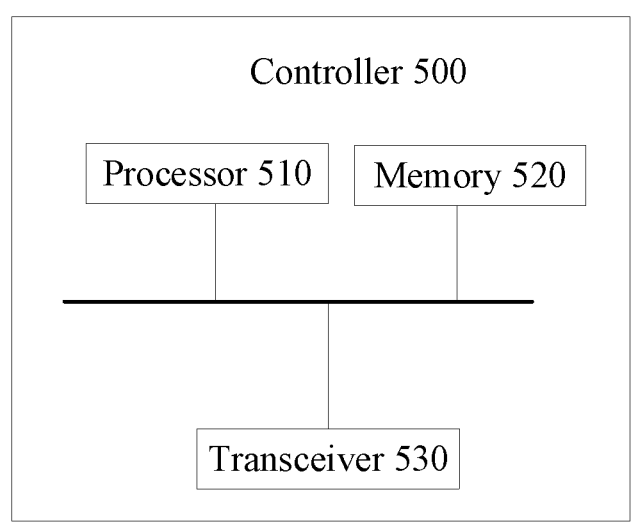
FIG. 5 illustrates a schematic block diagram of a controller according to various disclosed embodiments of the present disclosure.

FIG. 5 illustrates a schematic block diagram of a controller 500 according to various disclosed embodiments of the present disclosure.

As shown in FIG. 5, the controller 500 may include a processor 510 and a memory 520. The memory 520 may be configured to store program code, and the processor 510 may be configured to execute the program code stored in the memory 520.

Optionally, as shown in FIG. 5, the controller 500 may further include a transceiver 530, and the processor 510 may control external communication of the transceiver 530.

Optionally, the processor 510 may be configured to call the program code stored in the memory 520 to implement corresponding operations of the controller in the method embodiments, which not be described in detail for brevity herein.

The embodiments of the present disclosure provide the gimbal. The gimbal may include the base, the controller, and the rotation structure. Based on the acceleration of the base, the controller may control the movement of the rotation structure and the movement response speed of the gimbal, thereby facilitating the attitude adjustment of the camera on the gimbal.

Furthermore, the gimbal may include at least two IMUs. The at least two IMUs may include one IMU, having no movement relative to the base, which is configured to measure the angular velocity, the acceleration and/or attitude of the base, and may also include another IMU, having no movement relative to the camera, which is configured to measure the angular velocity, the acceleration and/or attitude of the camera.

Furthermore, the gimbal may include the input system, configured to input the acceleration coefficient and the velocity coefficient preset by the user.

The control method of the controller may refer to the description of the above-mentioned embodiments, and the gimbal structure may refer to FIG. 1, which not be described in detail for brevity herein.

Optionally, in the embodiments of the present disclosure, the gimbal may be a handheld gimbal and may also be configured at the unmanned aerial vehicle. The unmanned aerial vehicle which is configured according to the embodiments of the present disclosure may be described in detail hereinafter.

Figure 6:
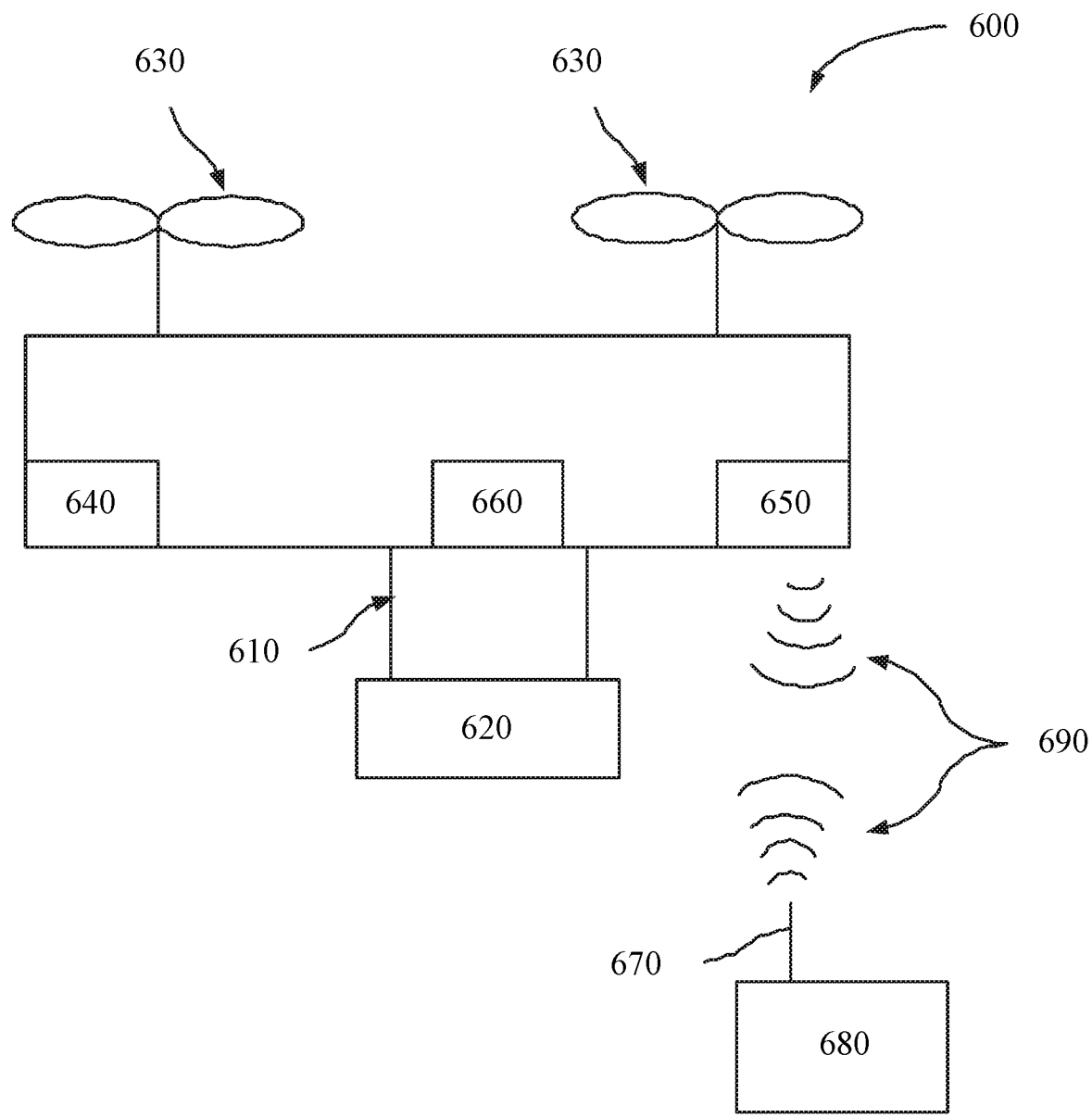
FIG. 6 illustrates a schematic block diagram of an unmanned aerial vehicle according to various disclosed embodiments of the present disclosure.

FIG. 6 illustrates a schematic block diagram of an unmanned aerial vehicle 600 according to various disclosed embodiments of the present disclosure. As shown in FIG. 6, the unmanned aerial vehicle 600 may include a gimbal 610 and a camera 620. Only a portion of the unmanned aerial vehicle 600 may be shown in FIG. 11 for description, and the unmanned aerial vehicle 600 may also include other portions. The camera 620 may be connected to the unmanned aerial vehicle through the gimbal 610. The unmanned aerial vehicle 600 may further include a power system 630, a sensing system 640, a communication system 650, and an image processing device 660.

The power system 630 may include an electronic governor, one or more propellers, one or more motors corresponding to one or more propellers. The motors and propellers may be disposed on corresponding arms. The electronic governor may be configured to receive drive signals generated by the flight controller and provide drive current to the motors according to the drive signals, thereby controlling the rotation speed and/or steering of the motors. The motors may be configured to drive the propellers to rotate, thereby providing power to the flight of the unmanned aerial vehicle, where the power may enable the unmanned aerial vehicle to implement the movement of one or more degrees of freedom. In some embodiments, the unmanned aerial vehicle may rotate around one or more rotating axes. For example, the rotating axes may include the roll axis, the yaw axis, and the pitch axis. It should be understood that the motor may be a direct current motor or an alternating current motor. In addition, the motor may be a brushless motor or a brushed motor.

The sensing system 640 may be configured to measure the attitude information of the unmanned aerial vehicle, that is, the spatial position information and status information of the unmanned aerial vehicle. The attitude information may include three-dimensional positions, three-dimensional angles, three-dimensional velocities, three-dimensional accelerations, three-dimensional angular velocities, and the like. The sensing system may include at least one of gyroscope, an electronic compass, an inertial measurement unit (IMU), a vision sensor, a global positioning system (GPS), a barometer, and the like. The flight controller may be configured to control the flight of the unmanned aerial vehicle. For example, the flight of the unmanned aerial vehicle may be controlled by the attitude information measured by the sensing system. It should be understood that the flight controller may control the unmanned aerial vehicle according to pre-programmed program instructions, and also control the unmanned aerial vehicle by responding one or more control instructions from a control device.

The communication system 650 may communicate with a terminal device 680 having a communication system 670 through wireless signals 690. The communication system 650 and the communication system 670 may include a plurality of transmitters, receivers, and/or transceivers for wireless communication. The wireless communication may be a one-way communication, for example, only the unmanned aerial vehicle 600 may transmit data to the terminal device 680. Or the wireless communication may be a two-way communication, and data may be transmitted from the unmanned aerial vehicle 600 to the terminal device 680 and may also be transmitted from the terminal device 680 to the unmanned aerial vehicle 600.

Optionally, the terminal device 600 may provide control data to one or more unmanned aerial vehicles 600, gimbals 610 and cameras 620, and may also receive information transmitted by the unmanned aerial vehicles 600, gimbals 610 and cameras 620. The control data provided by the terminal device 600 may be configured to control states of one or more unmanned aerial vehicles 600, gimbals 610 and cameras 620. Optionally, a communication module may be included in the gimbal 610 and the camera 620 for communicating with the terminal device 680.

It can be understood that the gimbal 610 included in the unmanned aerial vehicle and shown in FIG. 6 may refer to the description of the above-mentioned embodiments of the present disclosure, which not be described in detail for brevity herein.

It should be noted that the above-mentioned description may merely the embodiments of the present disclosure and may not intended to limit the scope of the present disclosure. Those skilled in the art should understand that various modifications may be made in the present disclosure, or equivalent replacements of some or all of the technical features may be made in the present disclosure. However, the modifications and equivalent replacements made within the spirit and principle of the present disclosure should be included in the scope of the various claims of the present disclosure. The scope of the present disclosure is defined by the scope of the appended claims and their equivalents.

What is claimed is:

1. A control method for a gimbal, comprising:
    determining an acceleration of a base of the gimbal; and
    according to the acceleration of the base, controlling a movement response speed of the gimbal to allow an attitude adjustment of a camera mounted at the gimbal.

2. The method according to claim 1, wherein controlling the movement response speed of the gimbal according to the acceleration of the base includes:
    controlling the movement response speed of the gimbal according to the acceleration of the base and an angular velocity of the camera.

3. The method according to claim 2, wherein controlling the movement response speed of the gimbal according to the acceleration of the base and the angular velocity of the camera includes:
    controlling the movement response speed of the gimbal according to the acceleration of the base and a relationship between the angular velocity of the camera and an angular velocity of the base.

4. The method according to claim 3, wherein controlling the movement response speed of the gimbal according to the acceleration of the base and the relationship between the angular velocity of the camera and the angular velocity of the base includes:

adjusting the movement response speed of the gimbal, when the acceleration of the base is greater than or equal to a first value and a difference between the angular velocity of the base and the angular velocity of the camera is greater than or equal to a second value.

5. The method according to claim 2, wherein controlling the movement response speed of the gimbal according to the acceleration of the base and the angular velocity of the camera includes:
controlling the movement response speed of the gimbal according to the angular velocity of the base and a change rate of the angular velocity of the camera.

6. The method according to claim 5, wherein controlling the movement response speed of the gimbal according to the angular velocity of the base and the change rate of the angular velocity of the camera includes:
un-adjusting the movement response speed of the gimbal, when the acceleration of the base is less than or equal to a third value and the change rate of the angular velocity of the camera is less than or equal to a fourth value.

7. The method according to claim 2, wherein, before controlling the movement response speed of the gimbal according to the acceleration of the base and the angular velocity of the camera, the method further includes:
determining the angular velocity of the camera according to a first inertial measurement unit (IMU), wherein the first IMU does not move relative to the camera.

8. The method according to claim 1, wherein determining the acceleration of the base of the gimbal includes:
determining the acceleration of the base according to a second inertial measurement unit (IMU).

9. The method according to claim 1, further including:
determining an attitude quantity for adjusting the camera; and
controlling the movement response speed of the gimbal according to the acceleration of the base includes:
controlling the movement response speed of the gimbal according to the attitude quantity for adjusting the camera and the acceleration of the base.

10. The method according to claim 9, wherein controlling the movement response speed of the gimbal according to the attitude quantity for adjusting the camera and the acceleration of the base includes:
determining an adjustment degree for adjusting a preset velocity coefficient of the gimbal using a preset acceleration coefficient of the gimbal according to the acceleration of the base or according to the acceleration of the base and an angular velocity of the camera;
adjusting the preset velocity coefficient according to the preset acceleration coefficient and the adjustment degree; and
adjusting the movement response speed of the gimbal using an adjusted velocity coefficient and the attitude quantity for adjusting the camera.

11. The method according to claim 10, wherein adjusting the preset velocity coefficient according to the preset acceleration coefficient and the adjustment degree includes:
multiplying a product of the acceleration coefficient and the adjustment degree with the attitude quantity for adjusting the camera to obtain a fifth value; and
adding the fifth value to the preset velocity coefficient to obtain the adjusted velocity coefficient.

12. The method according to claim 10, wherein adjusting the movement response speed of the gimbal using the adjusted velocity coefficient and the attitude quantity for adjusting the camera includes:
adjusting the movement response speed of the gimbal according to a value obtained by multiplying a square of the adjusted velocity coefficient with a square of the attitude quantity for adjusting the camera.

13. The method according to claim 10, before determining the adjustment degree for adjusting the preset velocity coefficient of the gimbal using the preset acceleration coefficient of the gimbal, further including:
acquiring the preset acceleration coefficient and the preset velocity coefficient both preset by a user.

14. The method according to claim 9, before determining the attitude quantity for adjusting the camera, further including:
determining an actual attitude of the camera;
determining an actual attitude of the base; and
determining the attitude quantity for adjusting the camera according to the actual attitude of the camera and the actual attitude of the base.

15. The method according to claim 14, wherein determining the attitude quantity for adjusting the camera according to the actual attitude of the camera and the actual attitude of the base includes:
determining the attitude quantity for adjusting the camera by subtracting both the actual attitude of the camera and a dead zone, from the actual attitude of the base.

16. The method according to claim 14, wherein determining the actual attitude of the camera includes:
determining an actual attitude of a first IMU as the actual attitude of the camera, wherein the first IMU does not move relative to the camera.

17. The method according to claim 14, wherein determining the actual attitude of the base of the gimbal includes:
obtaining the actual attitude of the base according to an actual attitude of a first IMU and data of motor axles of the gimbal, wherein the first IMU does not move relative to the camera.

18. The method according to claim 1, wherein:
the gimbal is a handheld gimbal.

19. A controller, comprising:
a non-transitory memory, storing program code; and
a process, coupled with the memory and, when the program code being executed, configured to:
determine an acceleration of a base of a gimbal, and
control a movement response speed of the gimbal, according to the acceleration of the base, to allow an attitude adjustment of a camera mounted at the gimbal.

20. A gimbal, comprising:
a base, a controller, and a rotation structure, wherein:
the controller is configured to:
determine an acceleration of the base; and
according to the acceleration of the base, control a movement response speed of the gimbal, by controlling a movement of the rotation structure, to allow an attitude adjustment of a camera mounted at the gimbal.

* * * * *